United States Patent [19]

Frieser et al.

[11] 4,271,980
[45] Jun. 9, 1981

[54] MAGAZINE FOR PLATELIKE ARTICLES

[75] Inventors: Edwin Frieser; Jürgen Novotny, both of Graz, Austria

[73] Assignee: ELBAK Batteriewerke Gesellschaft mbH, Graz-Puntigam, Austria

[21] Appl. No.: 960,097

[22] Filed: Nov. 13, 1978

[30] Foreign Application Priority Data

Nov. 17, 1977 [AT] Austria .............................. 8236/77

[51] Int. Cl.³ ............................................. B65G 59/06
[52] U.S. Cl. .................................... 221/297; 221/298; 221/312 R; 414/126
[58] Field of Search ...................... 221/251, 296–298, 221/289, 312 R; 414/126, 127

[56] References Cited

U.S. PATENT DOCUMENTS

| 1,969,170 | 8/1934 | Erickson | 221/251 X |
| 3,443,706 | 5/1969 | Puhm | 414/126 X |
| 3,468,455 | 9/1969 | Voorhis | 221/251 X |
| 3,677,439 | 7/1972 | Bosworth et al. | 221/251 |

Primary Examiner—F. J. Bartuska
Attorney, Agent, or Firm—Martin A. Farber

[57] ABSTRACT

A storage space is defined by a wall which in its lower portion is provided with an inclined surface, which protrudes into the storage space. Claws are adapted to support superimposed platelike articles in the storage space. A pivoted pressure-applying lever is disposed opposite to the wall and arranged to clear the lowermost articles and to apply pressure to the second platelike article from below in the storage space so as to retain the second platelike article from below and to support platelike articles superimposed thereon in the storage space. The claws and the pressure applying lever are disengageable from the platelike articles in the storage space in alternation to effect a delivery of successive superimposed platelike articles from the storage space.

7 Claims, 1 Drawing Figure

U.S. Patent
Jun. 9, 1981
4,271,980
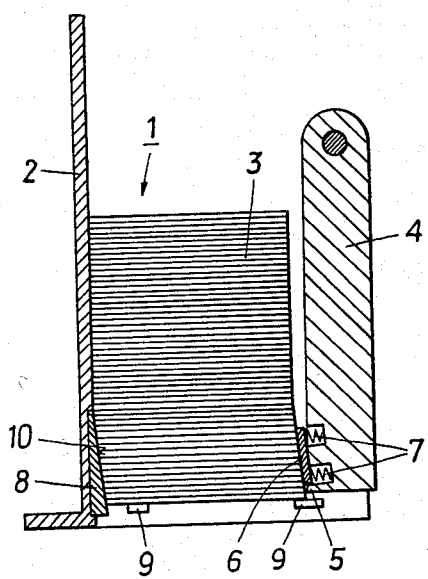

MAGAZINE FOR PLATELIKE ARTICLES

This invention relates to a magazine for platelike articles, particularly plates or separators for storage batteries, which magazine is closed at the bottom by retractable claws and is provided at least on one side with a retaining device, which is releasable in alternation with the claws and consists, e.g., of a pressure-applying lever and serves to retain superimposed platelike articles in said magazine except for the lowermost of said articles.

Such magazine is known from Austrian Pat. Specification No. 241,565 (corresponding to U.S. Pat. No. 3,443,706). In the magazine described there the pressure-applying device must exert on the superimposed platelike articles a considerable pressure force in order to prevent the superimposed articles from slipping out of the magazine when the claws have been retracted, particularly when the magazine is completely filled. In the preferred field of use for plates or separator of storage batteries, the exertion of such strong force gives rise to difficulties because such plates and separators consist of soft material and are undesirably deformed.

It is an object of the invention to ensure a reliable retention of the superimposed articles in the magazine even though a smaller pressure force is exerted.

This is accomplished according to the invention in that the wall of the magazine which is opposite to the pressure-applying lever is provided in its lower portion with an inclined surface which protrudes toward the pressure-applying lever the latter being provided with a pressure-applying plate with a surface parallel to the inclined surface on the opposite side of the articles.

Due to the provision of the inclined surface, a wedge action is exerted in the lowermost portion of the magazine so that the stacked platelike articles are reliably retained even when a strong pressure force is not applied by the pressure-applying lever.

Further details and advantages of the invention will be explained more fully hereinafter with reference to the accompanying drawing, in which an embodiment of the invention is shown diagrammatically and by way of example.

For the sake of simplicity, only one of the walls 2 which form the magazine 1 is shown. It will be understood, that the boundary members of the magazine 1 may consist of angled bars disposed at the corners of the magazine rather than of continuous walls.

A pressure-applying lever 4 is provided opposite to the wall 2 of the magazine and is pivotally movable by means which are not shown. At its lower end, the pressure-applying lever 4 carries a retaining nose 5, which faces the magazine 1. A stack 3 of superimposed articles is contained in the magazine 1 and rests on retractable claws 9. The retaining nose 5 of the pressure-applying lever 4 is spaced above the claws by a distance which is approximately as large as the thickness of one article of the stack 3.

On its side facing the stack 3, the pressure-applying lever 4 carries a pressure-applying plate 6, which is urged by compression springs 7 towards the stack 3.

When the pressure-applying lever 4 and the claws 9 are operated in alternation, articles can be singly taken from the stack 3 and the magazine 1, as has been described in Austrian Pat. No. 241,565.

When the claws 9 have been retracted to deliver an article from the stack, the latter is retained in the magazine 1 only by being clamped between the wall 2 and the pressure-applying lever 4. The required clamping force to be applied by the lever 4 is much reduced in that, in accordance with the invention, the wall 2 is provided in its lowermost portion with an inclined surface 10, which protrudes from the wall 2 toward the pressure-applying lever 4. In the magazine shown on the drawing, the surface of the pressure-applying plate 6 which engages the articles is parallel to the inclined surface 10 and the compression springs 7 extend at right angles to the inclined surface 10.

In the embodiment shown the inclined surface consists of an upwardly tapering wedge 8, which is inserted in the wall.

Alternatively, the wall 2 may be provided with vertical guide bars, which have upwardly tapering lower portions, which form wedgelike inclined surfaces.

What is claimed is:

1. A magazine for platelike articles, comprising
   a wall defining a storage space and a lowermost portion,
   a rigid unyielding inclined surface projecting into said storage space and extending downwardly and laterally inwardly with respect to said storage space,
   withdrawable claw means defining the lower end of said storage space and disengagably supporting superimposed platelike articles in said storage space,
   means comprising a pivotally movable pressure-applying lever is disposed on at least a side of said storage space opposite to said inclined surface and arranged to clear a lowermost of said articles and to apply pressure to a second platelike article from the bottom in said storage space so as to retain the second platelike article from the bottom and to support platelike articles superimposed thereon in said storage space pressing articles against said rigid unyielding inclined surface,
   said inclined surface is disposed only at said lowermost portion of said wall and extends lower than said lever,
   said claw means and said pressure-applying lever being disengageable from said platelike articles in said storage space in alternation to effect a delivery of successive ones of said superimposed platelike articles from said storage space,
   a pressure-applying plate disposed on said pressure-applying lever, said pressure-applying plate has an engaged surface which engages the articles, said pressure-applying plate engages a lower portion of said pressure-applying lever such that said engaging surface of said pressure-applying plate extends parallel to said inclined surface and is engageable with said articles, adjacent the bottom, and
   compression springs are mounted on said pressure-applying lever, said compression springs extend at right angles to said inclined surface and bias said pressure-applying plate toward said inclined surface.

2. A magazine as set forth in claim 1, in which said inclined surface is formed on at least one upwardly tapering wedge which is inserted in said wall.

3. A magazine as set forth in claim 1, wherein
   said inclined surface comprises at least one vertical guide bar provided on the wall,
   said at least one guide bar tapers upwardly forming said inclined surface.

4. The magazine as set forth in claim 1, wherein said pressure-applying plate has upper and lower ends respectively disposed lower and higher than corresponding ends of said inclined surface.

5. The magazine as set forth in claim 1, wherein said inclined surface extends lower than said claw means and said lower end of said storage space.

6. The magazine as set forth in claim 1, wherein said pressure-applying lever has a plate engaging surface disposed between said compression springs, said plate engaging surface is parallel to said inclined surface and engages said pressure-applying plate.

7. The magazine as set forth in claim 6, wherein said pressure-applying lever is formed with recesses, said compression springs are mounted in said recesses and extend therefrom engaging said pressure-applying plate at upper and lower ends of the latter, respectively.

* * * * *